(12) United States Patent
Cho et al.

(10) Patent No.: US 10,754,859 B2
(45) Date of Patent: Aug. 25, 2020

(54) ENCODING EDGES IN GRAPH DATABASES

(71) Applicant: Microsoft Technology Licensing, LLC, Redmond, WA (US)

(72) Inventors: SungJu Cho, Cupertino, CA (US); Yinyi Wang, Saratoga, CA (US); Qingpeng Niu, San Jose, CA (US); Andrew Rodriguez, Palo Alto, CA (US)

(73) Assignee: Microsoft Technology Licensing, LLC, Redwood Shores, CA (US)

( * ) Notice: Subject to any disclaimer, the term of this patent is extended or adjusted under 35 U.S.C. 154(b) by 489 days.

(21) Appl. No.: 15/337,716

(22) Filed: Oct. 28, 2016

(65) Prior Publication Data

US 2018/0121512 A1    May 3, 2018

(51) Int. Cl.
*G06F 16/22* (2019.01)
*G06F 16/2455* (2019.01)
*G06F 16/901* (2019.01)
*G06F 16/2457* (2019.01)

(52) U.S. Cl.
CPC ......... *G06F 16/2455* (2019.01); *G06F 16/22* (2019.01); *G06F 16/24578* (2019.01); *G06F 16/9024* (2019.01)

(58) Field of Classification Search
CPC ............................ G06F 17/30312; G06F 16/22
See application file for complete search history.

(56) References Cited

U.S. PATENT DOCUMENTS 3,524,926 A * 8/1970 Greaves .................. H03M 3/02
  341/77
5,494,028 A * 2/1996 DeVries ................ A61M 16/00
  128/204.18
6,081,665 A    6/2000 Nilsen et al.
7,376,639 B2   5/2008 Kutsch et al.
8,185,558 B1   5/2012 Narayanan et al.
(Continued)

FOREIGN PATENT DOCUMENTS

EP    2937797 A1    10/2015

OTHER PUBLICATIONS

Drew Koszewnik; "The Netflix Tech Blog: NettlixGraph Metadata Library: An Optimization Case Study", Jan. 18, 2013, XP055362100, retrieved from the internet: URL: http://techblog.netflix.com/2013/01/netflixgraph-metadata-library_18.html.
(Continued)

*Primary Examiner* — Apu M Mofiz
*Assistant Examiner* — Dara J Glasser
(74) *Attorney, Agent, or Firm* — Hickman Palermo Becker Bingham LLP

(57) ABSTRACT

The disclosed embodiments provide a system for processing data. During operation, the system obtains a group of two or more integer values. Next, the system sets, for each integer value in the two or more integer values, a delta encoding tag that represents a delta encoding of the integer value with respect to at least one other integer value in the group and uses a delta encoding state represented by the delta encoding tag to calculate an encoded value from the integer value. The system then encodes a length of the encoded value in a length tag for the integer value. Finally, the system replaces the integer value in the group with an encoded version containing the delta encoding tag, the length tag, and the encoded value.

19 Claims, 6 Drawing Sheets

(56) References Cited

U.S. PATENT DOCUMENTS

| | | | |
|---|---|---|---|
| 8,527,497 | B2 | 9/2013 | Singh et al. |
| 8,533,182 | B1 | 9/2013 | Charboneau |
| 8,736,612 | B1 | 5/2014 | Goldman et al. |
| 9,189,520 | B2 | 11/2015 | May et al. |
| 9,292,570 | B2 | 3/2016 | Sargeant et al. |
| 9,330,138 | B1 | 5/2016 | Shankar et al. |
| 9,372,891 | B2 | 6/2016 | Elias et al. |
| 9,378,303 | B1 | 6/2016 | Shankar et al. |
| 9,495,427 | B2 | 11/2016 | Abadi et al. |
| 2003/0084043 | A1 | 5/2003 | Acharya et al. |
| 2005/0071335 | A1 | 3/2005 | Kadatch |
| 2006/0036564 | A1 | 2/2006 | Yan et al. |
| 2007/0192306 | A1 | 8/2007 | Papakonstantinou et al. |
| 2007/0239694 | A1 | 10/2007 | Singh et al. |
| 2008/0116449 | A1 | 5/2008 | Macready et al. |
| 2008/0306910 | A1 | 12/2008 | Singh |
| 2009/0132503 | A1 | 5/2009 | Sun et al. |
| 2009/0240649 | A1 | 9/2009 | Sereni et al. |
| 2009/0240682 | A1 | 9/2009 | Balmin et al. |
| 2011/0122003 | A1* | 5/2011 | Van Den Boom ...... H03M 7/30 341/106 |
| 2011/0270861 | A1 | 11/2011 | Arshavsky et al. |
| 2011/0276781 | A1 | 11/2011 | Sengupta et al. |
| 2012/0005224 | A1 | 1/2012 | Ahrens et al. |
| 2012/0047114 | A1 | 2/2012 | Duan et al. |
| 2012/0054129 | A1 | 3/2012 | Aggarwal |
| 2012/0096043 | A1 | 4/2012 | Stevens, Jr. |
| 2012/0136884 | A1 | 5/2012 | Kanawa |
| 2012/0179644 | A1 | 7/2012 | Miranker |
| 2012/0271813 | A1* | 10/2012 | Shen ................ G06F 17/30312 707/711 |
| 2012/0284255 | A1 | 11/2012 | Schechter et al. |
| 2012/0310959 | A1 | 12/2012 | Huhn |
| 2012/0311036 | A1 | 12/2012 | Huhn |
| 2013/0091122 | A1 | 4/2013 | Salch et al. |
| 2013/0097180 | A1 | 4/2013 | Tseng |
| 2014/0156632 | A1 | 6/2014 | Yu |
| 2014/0172914 | A1 | 6/2014 | Elnikety et al. |
| 2014/0195564 | A1 | 7/2014 | Talagala et al. |
| 2014/0201234 | A1 | 7/2014 | Lee et al. |
| 2014/0280044 | A1 | 9/2014 | Huynh et al. |
| 2014/0310302 | A1 | 10/2014 | Wu et al. |
| 2014/0330867 | A1 | 11/2014 | Sarkar et al. |
| 2014/0337373 | A1 | 11/2014 | Morsi et al. |
| 2014/0355627 | A1* | 12/2014 | Bellessort ............... H04L 69/04 370/477 |
| 2015/0012523 | A1 | 1/2015 | Dey et al. |
| 2015/0026158 | A1 | 1/2015 | Jin |
| 2015/0052134 | A1 | 2/2015 | Bornea et al. |
| 2015/0120717 | A1 | 4/2015 | Kim et al. |
| 2015/0120775 | A1 | 4/2015 | Shao et al. |
| 2015/0127677 | A1 | 5/2015 | Wang et al. |
| 2015/0134637 | A1 | 5/2015 | Pall et al. |
| 2015/0149435 | A1 | 5/2015 | Mckenna et al. |
| 2015/0169686 | A1 | 6/2015 | Elias et al. |
| 2015/0234888 | A1 | 8/2015 | Ahmed et al. |
| 2015/0302300 | A1 | 10/2015 | Fletcher et al. |
| 2015/0339977 | A1 | 11/2015 | Nathan et al. |
| 2016/0071233 | A1 | 3/2016 | Macko et al. |
| 2016/0110434 | A1 | 4/2016 | Kakaraddi et al. |
| 2016/0132613 | A1 | 5/2016 | Obbard et al. |
| 2016/0171540 | A1 | 6/2016 | Mangipudi et al. |
| 2016/0188594 | A1 | 6/2016 | Ranganathan |
| 2016/0246842 | A1 | 8/2016 | Li et al. |
| 2016/0260011 | A1 | 9/2016 | Corvinelli et al. |
| 2016/0275177 | A1 | 9/2016 | Yin et al. |
| 2016/0314220 | A1 | 10/2016 | Sachdev et al. |
| 2017/0010968 | A1 | 1/2017 | Li et al. |
| 2017/0192949 | A1* | 7/2017 | Gaither ................. G06F 40/174 |
| 2017/0255708 | A1 | 9/2017 | Cho et al. |
| 2018/0039710 | A1 | 2/2018 | Chen et al. |
| 2018/0081937 | A1 | 3/2018 | Broecheler |
| 2018/0144060 | A1 | 5/2018 | Carter et al. |
| 2018/0144061 | A1 | 5/2018 | Rodriguez et al. |
| 2018/0349443 | A1* | 12/2018 | Carter ............... G06F 17/30501 |

OTHER PUBLICATIONS

Daniel K Blandford et al: "An Experimental Analysis of a Compact Graph Representation", Workshop on Algorithms Engineering and Experiments (ALENEX), Jan. 1, 2004, XP055177526.

Stepanov A. A. et al., "SIMD-Based Decoding of Posting Lists", Proceedings of the 20th ACM Conference on Information and Knowledge Management, XP002759898, retrieved from the internet: URL: http://www.stepanovpapers.com/CIKM_2011.pdf, Oct. 24-28, 2011.

D. Lemire et al., "Decoding billions of integers per second through vectorization", Software Practice & Experience, vol. 45, No. 1, Jan. 1, 2015, XP055363887, pp. 1-29.

"Final Office Action issued in U.S. Appl. No. 15/058,028", dated Jul. 27, 2018, 10 Pages.

"Non Final Office Action issued in U.S. Appl. No. 15/058,028", dated Jan. 26, 2018, 20 Pages.

"Non Final Office Action Issued in U.S. Appl. No. 15/360,605", dated Oct. 17, 2018, 19 Pages.

Ousterhout, et al., "The RAMCloud Storage System", In Journal of ACM Transactions on Computer Systems, vol. 33, Issue 3, Aug. 2015, 55 Pages.

"International Search Report and Written Opinion Issued in PCT Application No. PCT/US2016/067461", dated May 2, 2017, 12 Pages.

"International Search Report and Written Opinion Issued in PCT Application No. PCT/US2016/068119", dated Aug. 18, 2017, 11 Pages.

Shao, et al., "Trinity: a distributed graph engine on a memory cloud", In Proceedings of the ACM SIGMOD International Conference on Management of Data, Jun. 22, 2013, pp. 505-516.

Dean; "Challenges in building large-scale information retrieval systems", Keynote of the 2nd ACM International Conference on Web Search and Data Mining (WSDM). 2009 http://videolectures.net/wsdm09_dean_cblirs/.

Wikipedia: "Delta Encoding", The Free Encyclopedia. Accessed at https://en.wikipedia.org/wiki/Delta_encoding Apr. 10, 2017.

"Non-Final Office Action Issued in U.S. Appl. No. 15/360,318", dated Sep. 18, 2019, 15 Pages.

"Final Office Action Issued in U.S. Appl. No. 15/609,250", dated May 19, 2020, 17 Pages.

"Non-Final Office Action Issued in U.S. Appl. No. 15/609,250", dated Apr. 24, 2020, 18 Pages.

* cited by examiner

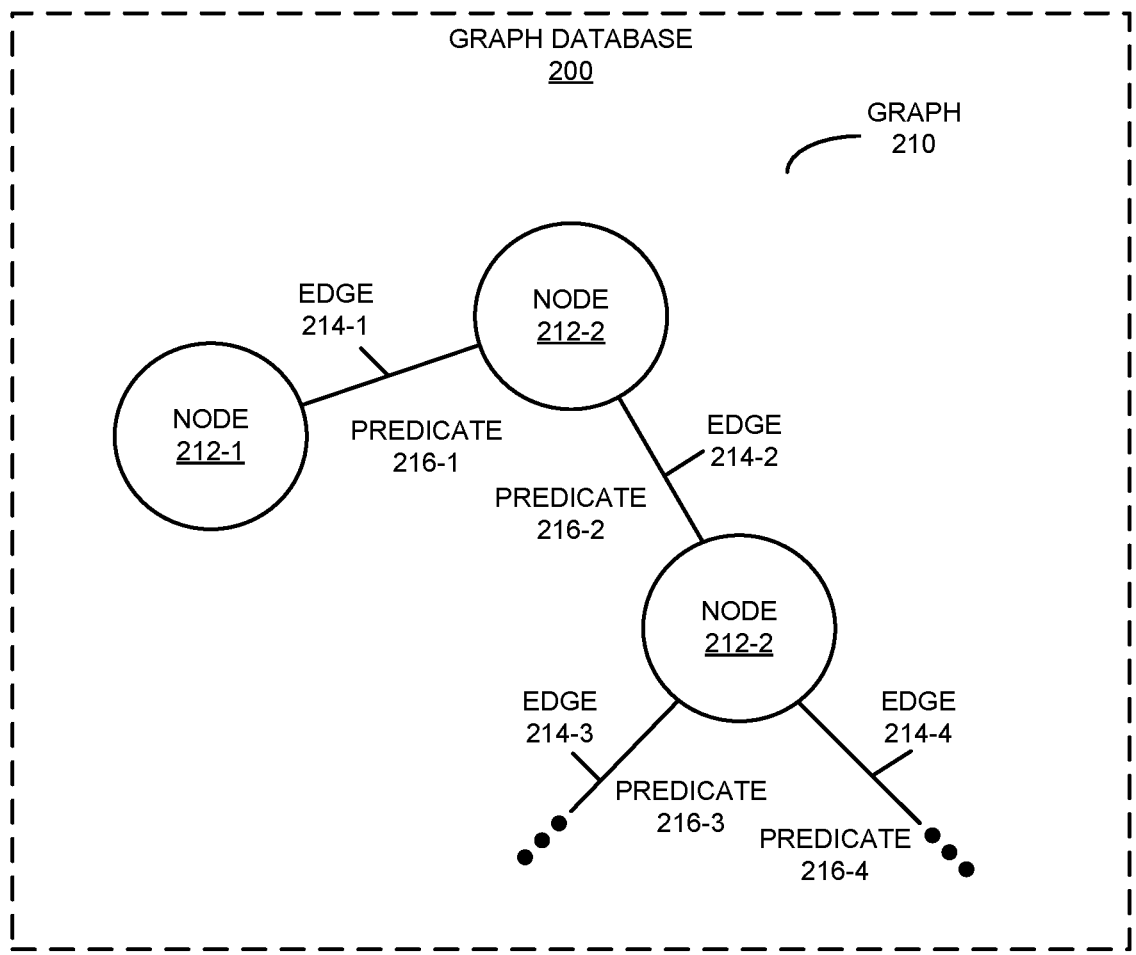
FIG. 2 (New)

ENCODING EDGES IN GRAPH DATABASES

RELATED APPLICATIONS

The subject matter of this application is related to the subject matter in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015, issued as U.S. Pat. No. 9,535,963.

The subject matter of this application is also related to the subject matter in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016

BACKGROUND

Field

The disclosed embodiments relate to graph databases. More specifically, the disclosed embodiments relate to techniques for encoding edges in graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

FIG. 2 shows a graph in a graph database in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
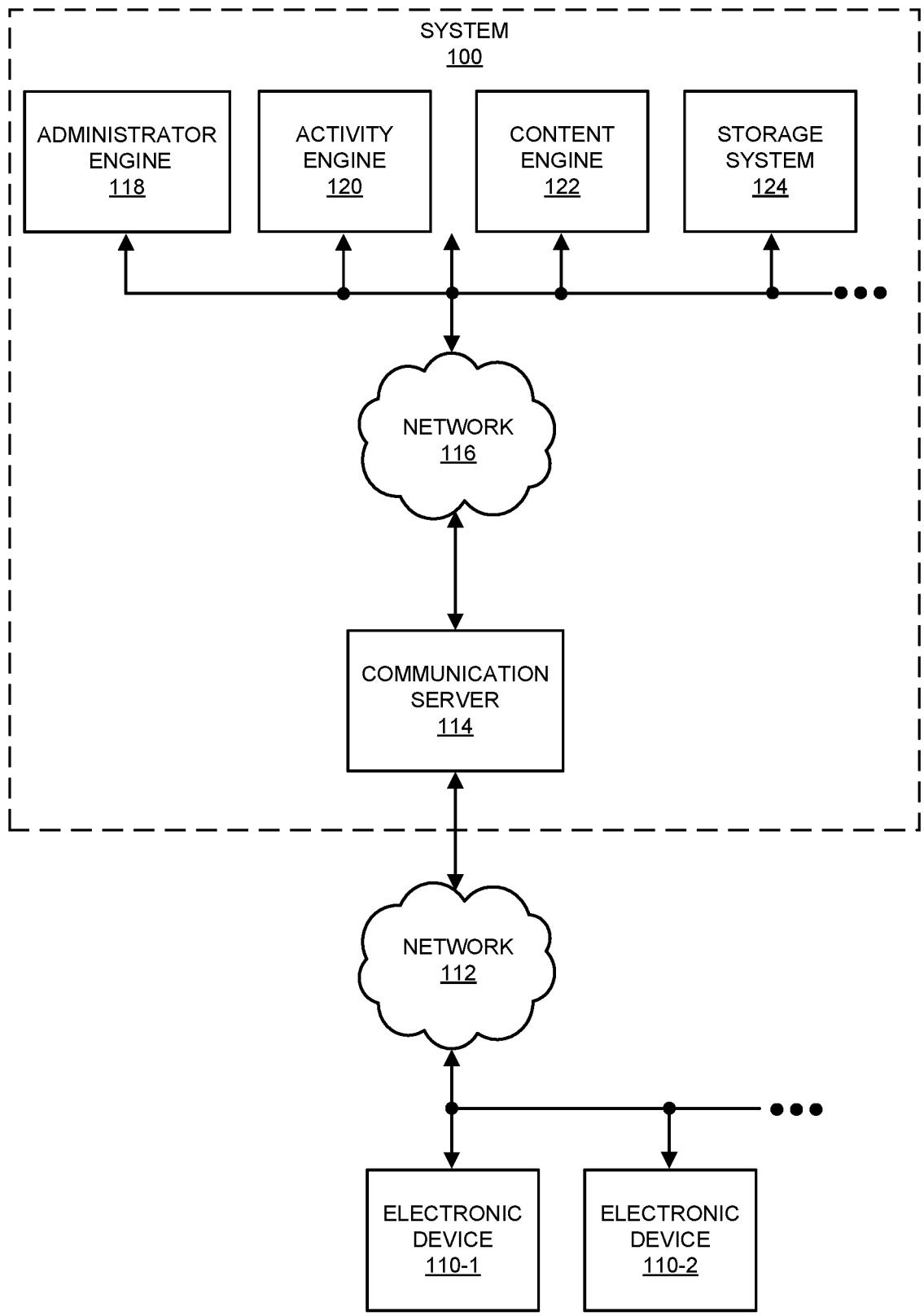
FIG. 1 shows a schematic of a system in accordance with the disclosed embodiments.

The disclosed embodiments provide a method, apparatus and system for encoding edges in a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, so that each node 212 in graph 210 includes a direct edge to its adjacent nodes without using an index lookup.

Note that graph database 200 may be an implementation of a relational model with constant-time navigation (i.e., independent of the size N), as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200. Such methods are described in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015, which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
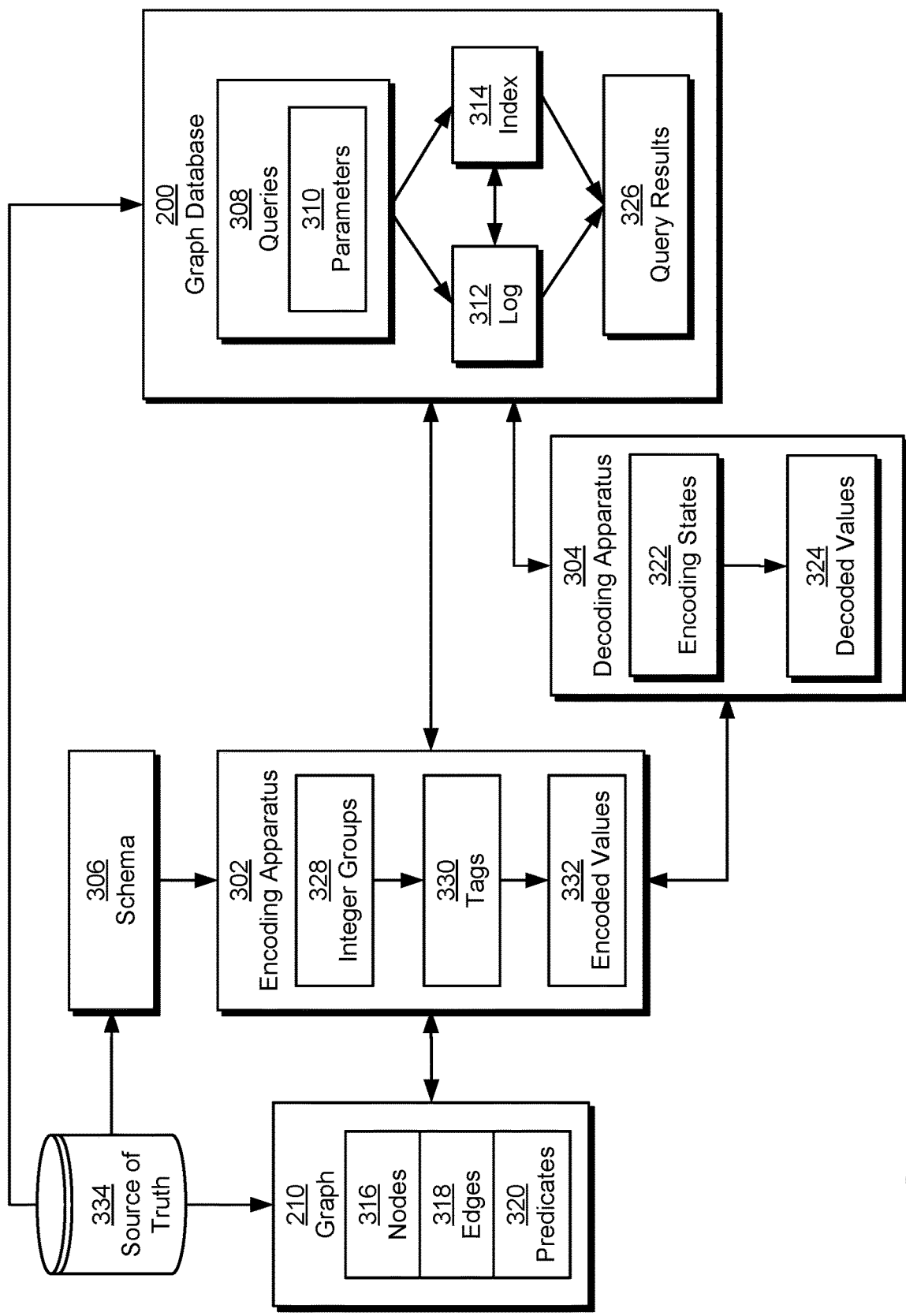
FIG. 3 shows a system for improving the memory footprint of a graph database in accordance with the disclosed embodiments.

In one or more embodiments, the memory footprint of graph database 200 is reduced by encoding edges and/or other integer values in the graph database. As shown in FIG. 3, graph 210 and one or more schemas 306 associated with the graph may be obtained from a source of truth 334 for graph database 200. For example, the graph and schemas may be retrieved from a relational database, distributed filesystem, and/or other storage mechanism providing the source of truth.

As mentioned above, graph 210 may include a set of nodes 316, a set of edges 318 between pairs of nodes, and a set of predicates 320 describing the nodes and/or edges. Each edge in the graph may be specified in a (subject, predicate, object) triple. For example, an edge denoting a connection between two members named "Alice" and "Bob" may be specified using the following statement:

Edge("Alice", "ConnectedTo", "Bob")

In the above statement, "Alice" is the subject, "Bob" is the object, and "ConnectedTo" is the predicate.

In addition, specific types of edges and/or more complex structures in graph 210 may be defined using schemas 306. Continuing with the previous example, a schema for employment of a member at a position within a company may be defined using the following:

```
DefPred("Position/company", "1", "node", "0", "node").
DefPred("Position/member", "1", " node", "0", "node").
DefPred("Position/start", "1", "node", "0", "date").
DefPred("Position/end_date", "1", "node", "0",
    "date").
M2C(positionId, memberId, companyId, start, end) :-
    Edge(positionId, "Position/member", memberId),
    Edge(positionId, "Position/company", companyId),
    Edge(positionId, "Position/start", start),
    Edge(positionId, "Position/end_date", end)
```

In the above schema, the employment is represented by four predicates, followed by a rule with four edges that use the predicates. The predicates include a first predicate representing the position at the company (e.g., "Position/company"), a second predicate representing the position of the member (e.g., "Position/member"), a third predicate representing a start date at the position (e.g., "Position/start"), and a fourth predicate representing an end date at the position (e.g., "Position/end_date"). In the rule, the first edge uses the second predicate to specify a position represented by "positionId" held by a member represented by "memberId," and the second edge uses the first predicate to link the position to a company represented by "companyId." The third edge of the rule uses the third predicate to specify a "start" date of the member at the position, and the fourth edge of the rule uses the fourth predicate to specify an "end" date of the member at the position.

Graph 210 and schemas 306 may additionally be used to populate a graph database 200 for processing queries 308 against the graph. More specifically, a representation of nodes 316, edges 318, and predicates 320 may be obtained from source of truth 334 and stored in a log 312 in the graph database. Lock-free access to the graph database may be implemented by appending changes to graph 210 to the end of the log instead of requiring modification of existing records in the source of truth. In turn, the graph database may provide an in-memory cache of the log and an index 314 for efficient and/or flexible querying of the graph.

In other words, nodes 316, edges 318, and predicates 320 may be stored as offsets in a log 312 that is read into memory in graph database 200. For example, the exemplary edge statement for creating a connection between two members named "Alice" and "Bob" may be stored in a binary log using the following format:

| | |
|---|---|
| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in log 312, offsets in the log may be used as representations of virtual time in the graph. More specifically, each offset may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

The graph database may also include an in-memory index 314 that enables efficient lookup of edges 318 by subject, predicate, object, and/or other keys or parameters 310. Index structures for graph databases are described in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016, which is incorporated herein by reference.

In one or more embodiments, the system of FIG. 3 includes functionality to reduce the memory footprint of graph database 200 by encoding integer values related to the offsets of nodes 316, edges 318, predicates 320, and/or other components of graph 210. More specifically, an encoding apparatus 302 may obtain various integer groups 328 from source of truth 334, graph database 200, and/or another source providing graph 210. Each integer group may specify a number of integer values, memory addresses, and/or offsets related to edges and/or other data structures in log 312 and/or index 314. For example, the integer group may include up to four integer values representing a subject, predicate, object, and/or offset for an edge in the graph. As a result, the integer group may consume up to 32 bytes of space on a platform that utilizes 64-bit integer data types.

To reduce the number of bytes used to store integer groups 328, encoding apparatus 302 may apply a group varint encoding to the integer groups to generate encoded values 332 from integer values in the integer groups. More specifically, the encoding apparatus may perform byte-aligned encoding of integer values in each integer group and specify, in a set of tags 330 for the integer group, the respective lengths of the resulting encoded values 332. For example, the encoding apparatus may set a length tag to represent the number of bytes occupied by a corresponding encoded integer value in an integer group. Moreover, a group of up to four integers representing a subject, predicate, object, and/or offset for an edge in graph 210 may store integer memory addresses that range from 257 (e.g., the end of a 256-byte header in a graph database 200 file) to $2^{40}$ (e.g., a file size limit for files in the graph database). Because the memory addresses are limited to the second through fifth bytes of a 64-bit integer value, each length tag may include two bits that indicate how many of the second through fifth bytes are stored in the corresponding group varint value.

To further reduce the size of the encoded integer values in a given integer group, encoding apparatus 302 may selectively apply delta encoding to the integer values. For example, the encoding apparatus may calculate deltas among the integer values in a way that minimizes the overall size of encoded values 332. The encoding apparatus may also include, in tags 330, delta encoding tags that represent the delta encoding states of the corresponding integer values. For example, each delta encoding tag may include two bits that indicate if delta encoding is applied to the corresponding integer value and/or how a delta is calculated for the integer value.

After tags 330 and encoded values 332 are generated for an integer group, encoding apparatus 302 may replace the integer group in graph database 200 with an encoded version that includes the tags and encoded values. For example, the encoding apparatus may substitute integer groups in keys, edges, records, and/or other data structures in log 312 and/or index 314 with the corresponding encoded versions to reduce the amount of memory and/or space required to store the integer groups. Encoding of integer groups in graph databases is described in further detail below with respect to FIG. 4.

In turn, a decoding apparatus 304 may use encoding states 322 represented by tags 330 stored with encoded values 332 to generate decoded values 324 for the corresponding integer groups 302 in graph database 200. Such decoding may be performed during processing of queries 308 of the graph database and/or analysis (e.g., testing, verification, etc.) of records in the graph database. To perform decoding of the encoded values, the decoding apparatus may first use length information from the length tags to identify bytes containing the corresponding encoded integer values in an integer group. Next, the decoding apparatus may perform a group varint decoding of the encoded integer values to obtain decoded integer values, which may include delta-encoded values. The decoding apparatus may then use the decoded integer values and delta encoding states in the corresponding delta encoding tags to recover the original integer values from any delta-encoded values. By combining group varint and delta encodings with integer groups maintained in the graph database, the encoding and decoding apparatuses may reduce the memory footprint of graph database 200 without incurring excessive decoding overhead during processing of queries 308.

Those skilled in the art will appreciate that the system of FIG. 3 may be implemented in a variety of ways. First, encoding apparatus 302, decoding apparatus 304, graph database 200, and/or source of truth 334 may be provided by a single physical machine, multiple computer systems, one or more virtual machines, a grid, one or more databases, one or more filesystems, and/or a cloud computing system. The encoding apparatus, decoding apparatus, and graph database may additionally be implemented together and/or separately by one or more hardware and/or software components and/or layers. For example, the encoding and/or decoding apparatuses may be included in query-processing components of the graph database, or the encoding and/or decoding apparatuses may execute separately from the query-processing components and/or the graph database.

Second, encoding and decoding of integer groups 328 in graph database 200 may be performed at various times. For example, encoding apparatus 302 may generate tags 330 and encoded values 332 for the integer groups as the integer groups are written to graph database 200, upon batch loading of the integer groups into the graph database (e.g., from source of truth 334), and/or during batch conversion of the integer groups to encoded versions of the integer groups within the graph database. Similarly, decoding apparatus 302 may generate decoded values 324 during matching of parameters 310 (e.g., subjects, predicates, objects, offsets, keys, etc.) of queries 308 to records in log 312 and/or index 314 and inclusion of the records in query results 326 that are returned in response to the queries.

Figure 4:
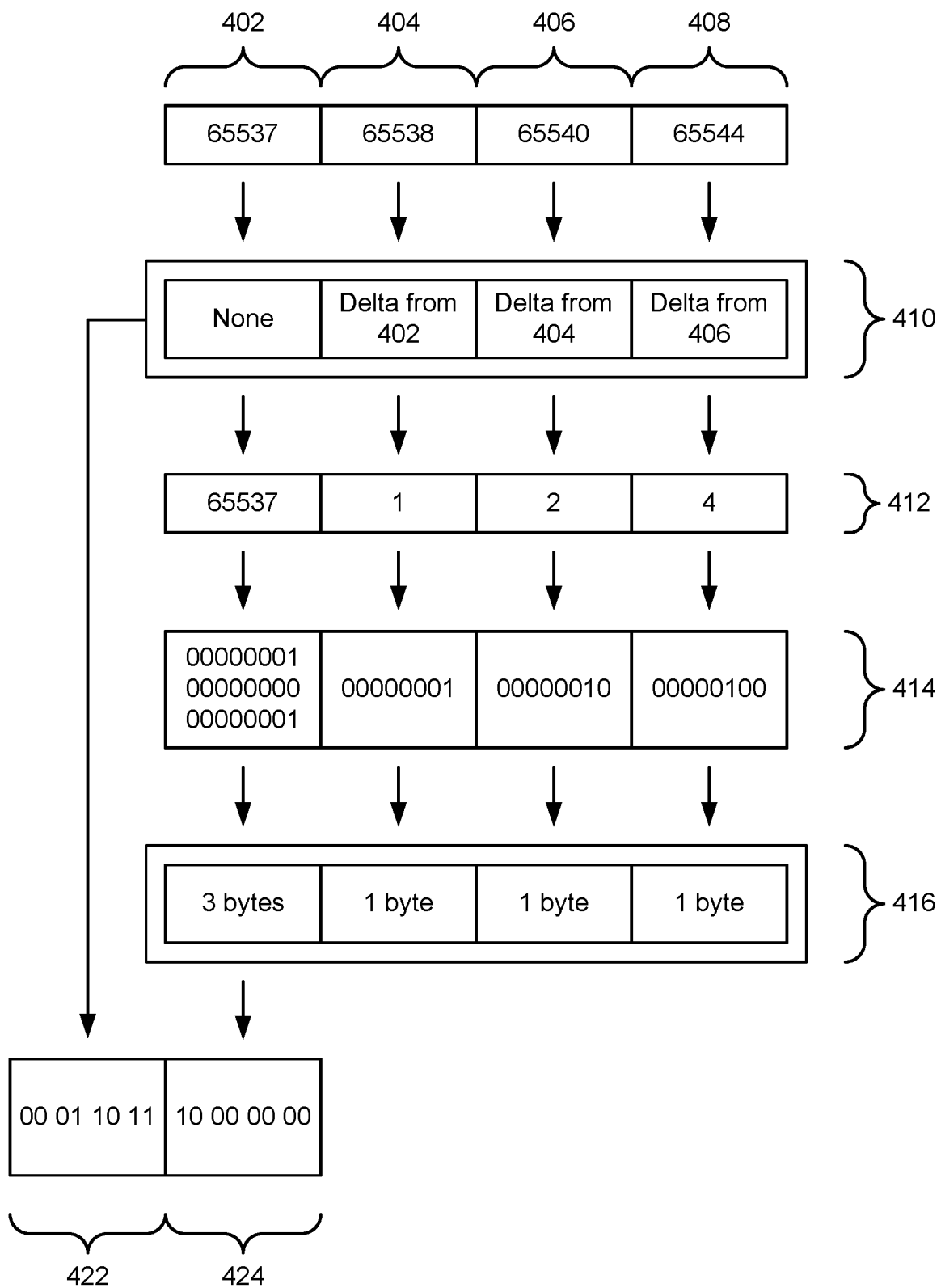
FIG. 4 shows an exemplary encoding of a group of integer values in accordance with the disclosed embodiments.

FIG. 4 shows an exemplary encoding of a group of integer values 402-408 in accordance with the disclosed embodiments. As shown in FIG. 4, integer value 402 may be set to 65537, integer value 404 may be set to 65538, integer value 406 may be set to 65540, and integer value 408 may be set to 65544.

Integer values 402-408 may represent memory addresses in a graph database, such as graph database 200 of FIG. 2. For example, the integer values may represent numeric memory addresses of a subject, predicate, object, and offset of an edge in the graph database. In turn, the integer values may be maintained in a subject-predicate-object index for the graph database, such as index 314 of FIG. 3. The layout of database files in the graph database may be used to restrict the range of possible memory addresses stored in the integer values. For example, each database file may have a 256-byte header and a maximum file size of $2^{40}$ (i.e., 1 TB), thereby limiting the memory addresses stored in the index to the second to the fifth bytes of a 64-bit (i.e., eight-byte) integer value and enabling a group varint encoding of each memory address to be stored in four bytes or less.

Next, a set of delta encoding states 410 is determined for integer values 402-408 and used to generate a set of deltas 412 from the integer values. The delta encoding states may indicate if and/or how the deltas are to be calculated from the integer values. For example, the delta encoding state of integer value 402 may be set to no delta encoding (e.g., "None"), the delta encoding state of integer value 404 may specify calculating a delta from integer value 402 (e.g., "Delta from 402"), the delta encoding state of integer value 406 may specify calculating a delta from integer value 404 (e.g., "Delta from 404"), and the delta encoding state of integer value 408 may specify calculating a delta from integer value 406 (e.g., "Delta from 406").

In turn, delta encoding states 410 may be used to produce deltas of 65537, 1, 2, and 4 for the respective integer values 402-408. The delta encoding states may additionally be encoded in a set of delta encoding tags 422 for the integer values. In particular, the delta encoding tags may occupy one byte of space, and each delta encoding tag may include two bits for specifying the delta encoding state of the corresponding integer value. Thus, four consecutive binary values of "00," "01," "10," and "11" in the delta encoding tags may indicate no delta encoding for integer value 402, delta encoding of integer value 404 from a "first" integer value 402, delta encoding of integer value 406 from a "second" integer value 404, and delta encoding of integer value 508 from a "third" integer value 406.

Delta encoding states 410 may also be selected to minimize the size of encoded values 414 generated from deltas 412. For example, the delta encoding states may specify the calculation of deltas between pairs of integer values 402-408 in a way that reduces the number of bytes occupied by the encoded values. Thus, the delta encoding states may be selected to produce the smallest deltas between pairs of integer values 402-408 in the group. Conversely, delta encoding of the integer values may be omitted if no deltas between the integer values reduce the number of bytes occupied by the encoded values.

Encoded values 414 may then be calculated from deltas 412. For example, a group varint encoding may be used to produce an encoded binary value of "00000001 00000000 00000001" for integer value 402, an encoded binary value of "00000001" for the delta associated with integer value 404, an encoded binary value of "00000010" for the delta associated with integer value 406, and an encoded binary value of "00000100" for the delta associated with integer value 408.

Lengths 416 of encoded values 414 may be used to produce a set of length tags 424 for the integer group. As with delta encoding tags 422, the length tags may occupy one byte of space, and each length tag may include two bits for specifying the length of the corresponding encoded value. In turn, four consecutive binary values of "10," "00," "00," and "00" in the length tags may indicate a length of three bytes for integer value 402 and one byte for each of the remaining integer values 404-408. Thus, encoded values generated from deltas 412 for integer values 404-408 may provide a space savings of two bytes over encoded values generated from the original integer values.

Length tags 424 may also be used to represent different lengths based on the presence or absence of delta encoding in the corresponding encoded values 416. For example, a length tag of "00" may represent a length of two bytes for an encoded value that is not a delta and one byte for an encoded value that is a delta. A length tag of "01" may represent a length of three bytes for an encoded value that is not a delta and two bytes for an encoded value that is a delta. A length tag of "10" may represent a length of four bytes for an encoded value that is not a delta and three bytes for an encoded value that is a delta. A length tag of "11" may represent a length of five bytes for an encoded value that is not a delta and four bytes for an encoded value that is a delta. Differences in the number of bytes represented by the length tags for delta-encoded values and non-delta-encoded values may reflect a minimum space savings of one byte provided by delta encoding of a given integer value. When a delta encoding of the integer value does not provide at least one byte of space savings, the original integer value may be encoded to avoid unnecessary decoding overhead associated with recovering the integer value from a delta-encoded value.

Encoded values 414, delta encoding tags 422, and length tags 424 may be stored in an encoded version of the integer group that replaces the original, uncompressed integer values 402-408 in the graph database. By storing four 64-bit integers in eight bytes of space (i.e., one byte each for the delta encoding and length tags, three bytes for integer value 402, and one byte each for integer values 404-408), the encoded version may represent a savings of 24 bytes over storing uncompressed versions of the integers in the graph database.

Those skilled in the art will appreciate that variations of delta encoding and/or other types of encodings may be used to generate encoded versions of integer values 402-408. First, a delta encoding state that is a self-reference to the same integer value may indicate encoding of the integer value from a previous integer group in the graph database. For example, a delta encoding tag of "01" for integer value 402 may represent a delta encoding state that indicates calculation of a delta from the same integer value. In turn, calculation and/or storage of an encoded value for the integer value may be omitted, and the self-reference may be used to obtain the integer value from a preceding record in the same database file (e.g., in ordered edges from a compressed edge store and/or set of edge updates in a graph database index). For example, an encoded edge with the same subject and predicate as the preceding edge in the database file may have self-references to the subject and predicate in the corresponding delta encoding tags and lack encoded values for the subject and predicate. Instead, the self-references may be used to obtain integer values for the subject and predicate from the preceding edge. If the preceding edge also includes a self-reference to the subject and/or predicate, the database file may continue to be scanned in reverse order until a non-self-referencing delta encoding state and the corresponding encoded value are found. Alternatively, space savings in consecutive edges that are ordered and/or grouped under a given attribute (e.g., subject, predicate, object, etc.) in an index file may be implemented by storing the integer value and/or associated tags for the attribute in a header for the group instead of the edges.

Second, an ascending or descending order associated with delta encoding of groups of integer values may be specified in headers for the groups. For example, each edge stored in the graph database may include a group of integer values that specify a subject, predicate, and object defining the edge and be positioned at a given offset in a graph database file. The edge may additionally include a two-byte header that includes the delta encoding tags and length tags, a flag indicating if the edge is to be added to or deleted from the graph database, and another flag indicating if delta encodings among the integer values are to be calculated in ascending order (i.e., calculating deltas from the smallest value in the group) or descending order (i.e., calculating deltas from the largest value in the group).

In addition, the ascending or descending order may be selected to reduce the size of the corresponding deltas. For example, an edge may be defined by and/or associated with the following integer values:
subject=z
predicate=x
object=y
offset=n Assuming x<y<z<n, deltas calculated using an ascending order of the integer values may include "z−y" for the subject, "y−x" for the predicate, and "x" for the object. Deltas calculated using a descending order of the integer values may include "n−z" for the subject, "z−y" for the predicate, and "y−x" for the object. Because both orderings include "y−x" and "z−y," an ascending order for calculating the deltas may be selected if "x" is smaller than "n−z," and a descending order may be selected otherwise. As described above, delta encoding of the integer values may additionally be omitted if the encoded values of the deltas do not consume less space than the encoded values of the original integers.

Figure 5:
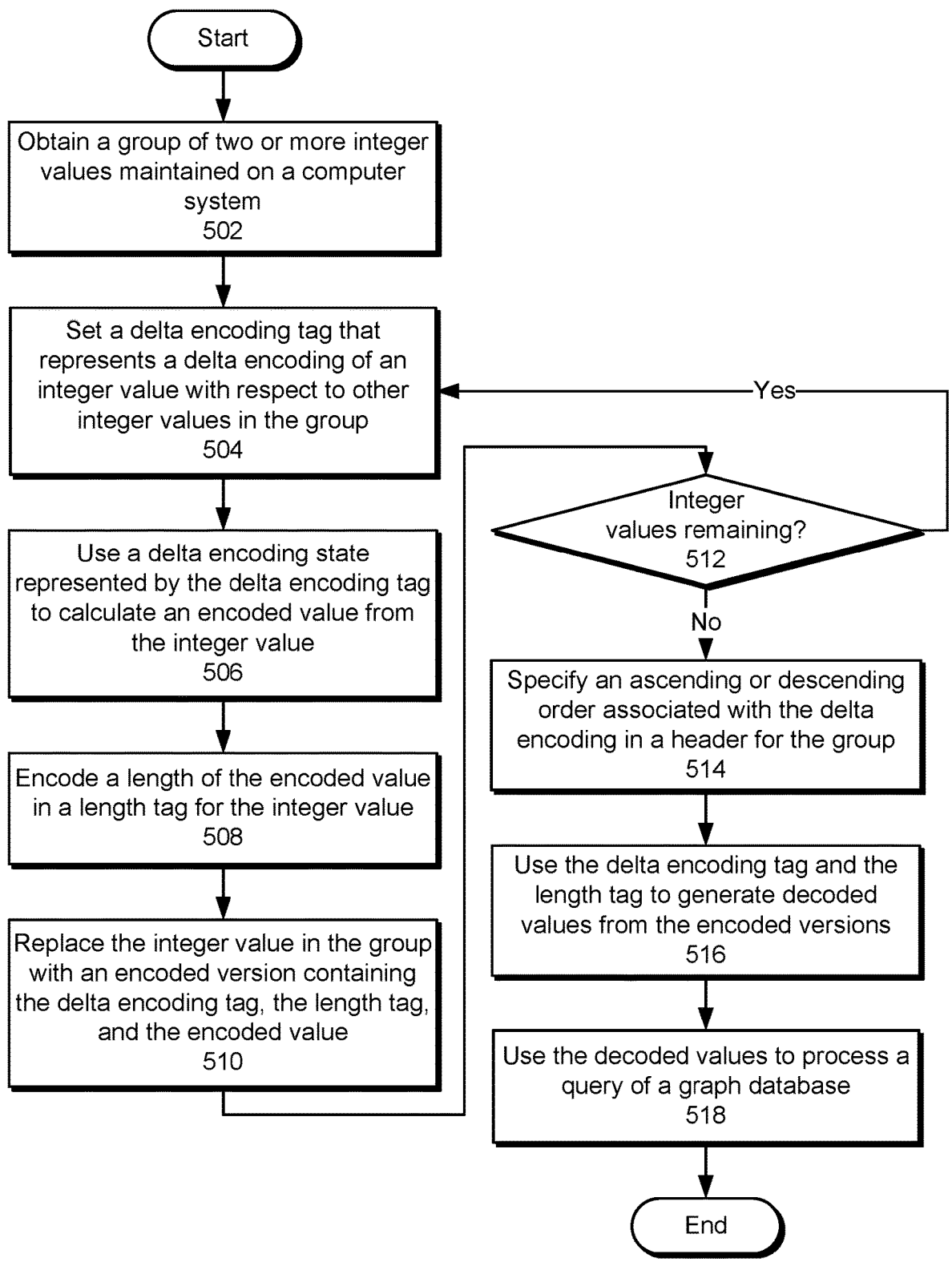
FIG. 5 shows a flowchart illustrating the processing of data in accordance with the disclosed embodiments.

FIG. 5 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a group of two or more integer values maintained on a computer system is obtained (operation 502). For example, the group may include two or more memory addresses associated with a subject, predicate, object, and/or offset of an edge in a graph database. To optimize the encoding of 64-bit memory addresses in the graph database, nonzero values in each memory address may be restricted to the second to fifth bytes of the memory address.

Next, a delta encoding tag that represents a delta encoding of an integer value with respect to other integer values in the group is set (operation 504), and a delta encoding state represented by the delta encoding tag is used to calculate an encoded value from the integer value (operation 506). For example, the delta encoding tag may include two bits that reference one of the integer values in the group to specify delta encoding using the referenced value, or the delta encoding tag may lack a reference to any of the integer values to indicate a lack of delta encoding of the integer value. The delta encoding tag may contain a self-reference to the integer value when a preceding group of integer values in the graph database and/or computer system stores the same integer value in the same position. In turn, the self-reference may cause calculation of the encoded value to be omitted. When the delta encoding tag indicates a lack of delta encoding of the integer value, the encoded value may be calculated using a group varint and/or other variable-length integer encoding technique. Finally, a delta encoding tag that references another integer value in the group may indicate that the encoded value is to be calculated from a difference between the two integer values.

After the encoded value is calculated, a length of the encoded value is encoded in a length tag for the integer value (operation 508). For example, the length tag may specify the number of bytes occupied by the encoded value. The integer value in the group is then replaced with an encoded version containing the delta encoding tag, the length tag, and the encoded value (operation 510).

Operations 504-510 may be repeated for remaining integer values (operation 512) in the group. For example, the delta encoding tag, encoded value, and length tag may be generated for each unencoded integer value in the group and used as a replacement for the unencoded integer value to reduce the memory required to store the group. After all integer values the group have been replaced with encoded versions, an ascending or descending order associated with the delta encoding of the integer values is specified in a header for the group (operation 514). As with the delta encoding states of the integer values, the ascending or descending order may be selected to reduce the size of the deltas calculated among the integer values and/or the resulting encoded values. For example, the ascending or descending order may be selected before, during, and/or after operations 504-510 to improve the memory savings associated with delta encoding of integer values in the group.

Finally, the delta encoding tag and length tag are used to generate decoded values from the encoded versions (operation 516), and the decoded values are used to process a query of a graph database (operation 518). To produce each decoded value, the length tag may be used to identify the bytes containing the corresponding encoded value in the encoded group, and a group varint and/or other variable-length integer decoding may be used to obtain a decoded integer value from the encoded value. The decoded integer value and delta encoding state in the corresponding delta encoding tag may then be used to recover the original integer value when the delta encoding state indicates delta encoding of the original integer value. Finally, the decoded integer value may be included in a response to the query. For example, decoded integer values from the group may be used to resolve one or more edges stored in the graph database.

Figure 6:
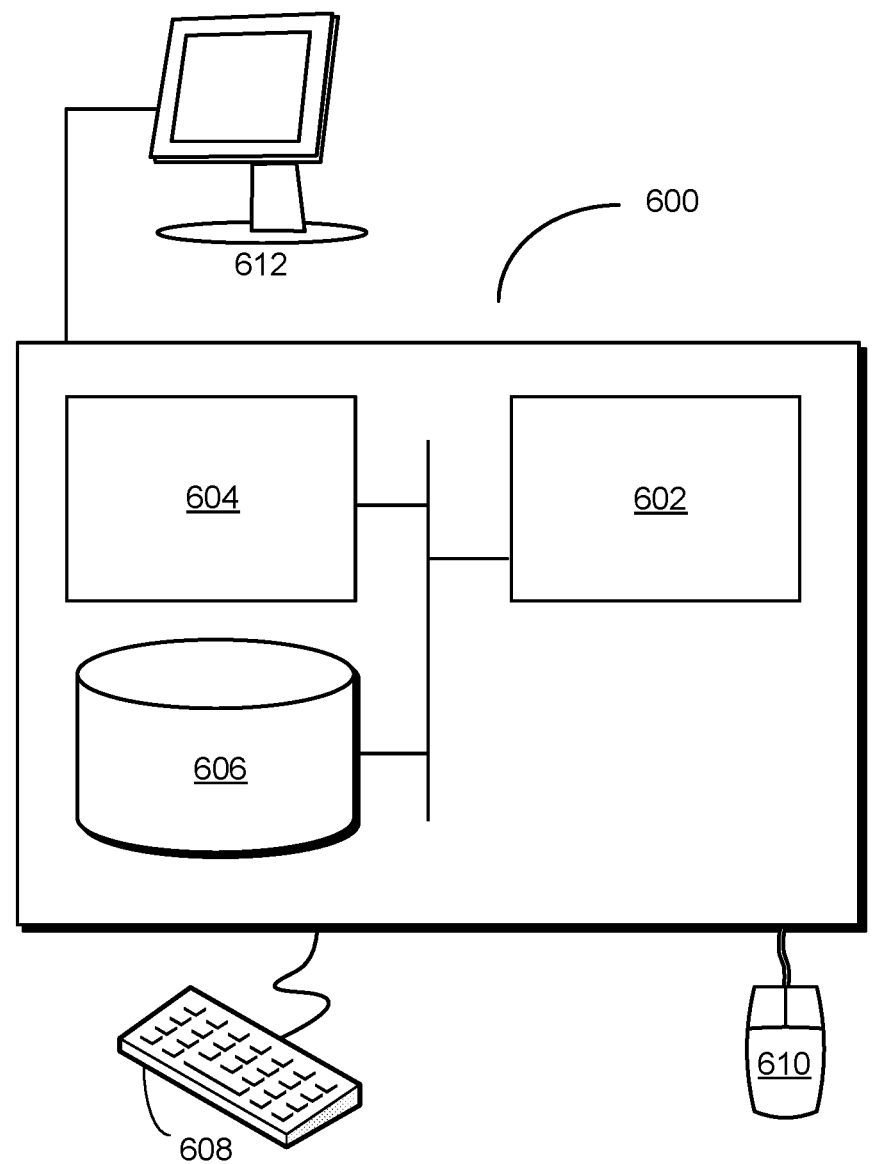
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for improving the memory footprint of a graph database. The system includes an encoding apparatus that obtains a group of two or more integer values to be stored in the graph database. Next, the encoding apparatus may set, for each integer value in the two or more integer values, a delta encoding tag that represents a delta encoding of the integer value with respect to other integer values in the group. The encoding apparatus may also use a delta encoding state represented by the delta encoding tag to calculate an encoded value from the integer value and encode a length of the encoded value in a length tag for the integer value.

The encoding apparatus may then replace the integer value in the group with an encoded version containing the delta encoding tag, the length tag, and the encoded value.

The system may also include a decoding apparatus that uses the delta encoding tag and the length tag to generate a decoded value from the encoded value. The decoding apparatus may also use the decoded value to process a query of the graph database.

In addition, one or more components of computer system 600 may be remotely located and connected to the other components over a network. Portions of the present embodiments (e.g., encoding apparatus, decoding apparatus, graph database, etc.) may also be located on different nodes of a distributed system that implements the embodiments. For example, the present embodiments may be implemented using a cloud computing system that encodes and decodes edges in a remote graph database.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a group of two or more integer values maintained on a computer system; and
   reducing an amount of memory used to store the two or more integer values by performing the following operations on the computer system:
      setting, for each integer value in the two or more integer values, a delta encoding state that indicates whether a delta encoding is to be calculated, wherein a first delta encoding state of a first integer value in the group of two or more integer values indicates that a delta encoding is to be calculated, and a second delta encoding state of a second integer value in the group of two or more integer values indicates that a delta encoding is not to be calculated; and
      for each integer value in the group of two or more integer values:
         if the delta encoding is to be calculated,
            specifying which integer value other than the integer value in the group of the two or more integer values is used as a reference for calculating the delta encoding of the integer value;
            using the delta encoding state to calculate an encoded value for the integer value;
            encoding a length of the encoded value in a length tag for the integer value; and
            replacing the integer value in the group with an encoded version comprising a delta encoding tag that represents the delta encoding state, the length tag, and the encoded value; and
         if the delta encoding is not to be calculated,
            determining if the delta encoding state of the integer value includes a self reference to the integer value which indicates obtaining a corresponding encoded value for the integer value from a preceding integer group linked to the group in a same database, wherein the preceding integer group includes the corresponding encoded value for the integer value; and
            if so,
               obtaining the corresponding encoded value for the integer value from the preceding integer group without calculating the corresponding encoded value.

2. The method of claim 1, further comprising:
   specifying an ascending order or descending order associated with the delta encoding in a header for the group.

3. The method of claim 1, wherein using the delta encoding state represented by the delta encoding tag to calculate the encoded value from the integer value comprises:
   using a group varint encoding to calculate the encoded value.

4. The method of claim 1, wherein using the delta encoding state to calculate an encoded value from the integer value comprises:
   when the delta encoding tag references the specified integer value in the group, calculating the encoded value from a difference between the integer value and the specified integer value.

5. The method of claim 1, wherein the length tag comprises two bits representing a number of bytes in the integer value.

6. The method of claim 1, wherein the delta encoding tag comprises two bits representing the delta encoding of the integer value.

7. The method of claim 1, further comprising:
   using the delta encoding tag and the length tag to generate a decoded value from the encoded value; and
   using the decoded value to process a query of a graph database.

8. The method of claim 7, wherein the decoded value is associated with at least one of:
   a subject;
   a predicate;
   an object;
   a n offset; and
   an edge.

9. The method of claim 7, wherein the encoded version is stored in at least one of:
   a log-based representation of the graph database; and
   an index for the graph database.

10. The method of claim 7, wherein the integer value comprises a second byte to a fifth byte of a 64-bit memory address in the graph database.

11. An apparatus, comprising:
    one or more processors; and
    memory storing instructions that, when executed by the one or more processors, cause the apparatus to:
       obtain a group of two or more integer values;
       set, for each integer value in the two or more integer values, a delta encoding state that indicates whether a delta encoding is to be calculated; and
       if the delta encoding is to be calculated,
          specify which integer value other than the integer value in the group of the two or more integer values is used as a reference for calculating the delta encoding of the integer value;
          use the delta encoding state to calculate an encoded value from the integer value;
          encode a length of the encoded value in a length tag for the integer value; and replace the integer value in the group with an encoded version comprising a delta encoding tag that represents the delta encoding state, the length tag, and the encoded value; and if the delta encoding is not to be calculated, determine if the delta encoding state of the integer value includes a self reference to the integer value which indicates obtaining a corresponding encoded value for the integer value from a preceding integer group linked to the group in a same database, wherein the preceding integer group includes the corresponding encoded value for the integer value; and if so, obtain the corresponding encoded value for the integer value from the preceding integer group without calculating the corresponding encoded value.

12. The apparatus of claim 11, wherein the memory further stores instructions that, when executed by the one or more processors, cause the apparatus to:

specify an ascending order or descending order associated with the delta encoding in a header for the group.

13. The apparatus of claim 11, wherein using the delta encoding state to calculate the encoded value from the integer value comprises:

using a group varint encoding to calculate the encoded value; and when the delta encoding tag references a second integer value in the group, calculating the encoded value from a difference between the integer value and the second integer value; or wherein when the delta encoding state represented by the delta encoding tag includes a self reference to the integer value, the memory further stores instructions that, when executed by the one or more processors, cause the apparatus to omit calculation of the encoded value.

14. The apparatus of claim 11, wherein the length tag comprises two bits for representing a number of bytes in the integer value and the delta encoding tag comprises two bits for representing the delta encoding of the integer value.

15. The apparatus of claim 11, wherein the memory further stores instructions that, when executed by the one or more processors, cause the apparatus to:

use the delta encoding tag and the length tag to generate a decoded value from the encoded value; and use the decoded value to process a query of a graph database.

16. The apparatus of claim 15, wherein the decoded value is associated with at least one of:

a subject;

a predicate;

an object;

an offset; and an edge.

17. The apparatus of claim 15, wherein the encoded version is stored in at least one of:

a log-based representation of the graph database; and an index for the graph database.

18. A system, comprising:

a graph database storing a graph, wherein the graph comprises a set of nodes, a set of edges between pairs of nodes in the set of nodes, and a set of predicates; and an encoding module comprising a non-transitory computer-readable medium comprising instructions that, when executed, cause the system to:

obtain a group of two or more integer values to be stored in the graph database; and set, for each integer value in the two or more integer values, a delta encoding state that indicates whether a delta encoding is to be calculated and if the delta encoding is to be calculated, specify which integer value other than the integer value in the group of the two or more integer values is used as a reference for calculating the delta encoding of the integer value;

use the delta encoding state to calculate an encoded value from the integer value;

encode a length of the encoded value in a length tag for the integer value; and replace the integer value in the group with an encoded version comprising a delta encoding tag that represents the delta encoding state, the length tag, and the encoded value; and if the delta encoding is not to be calculated, determine if the delta encoding state of the integer value includes a self reference to the integer value which indicates obtaining a corresponding encoded value for the integer value from a preceding integer group linked to the group in a same database, wherein the preceding integer group includes the corresponding encoded value for the integer value; and if so, obtain the corresponding encoded value for the integer value from the preceding integer group without calculating the corresponding encoded value.

19. The system of claim 18, further comprising:

a decoding module comprising a non-transitory computer-readable medium comprising instructions that, when executed, cause the system to:

use the delta encoding tag and the length tag to generate a decoded value from the encoded value; and use the decoded value to process a query of the graph database.

* * * * *